United States Patent
Jæger

(10) Patent No.: US 6,351,359 B1
(45) Date of Patent: Feb. 26, 2002

(54) CIRCUIT FOR BLOCKING A SEMICONDUCTOR SWITCHING DEVICE ON OVERCURRENT

(75) Inventor: Jens Ulrik Jæger, Graasten (DK)

(73) Assignee: Danfoss A/S, Nordborg (DK)

( * ) Notice: Subject to any disclaimer, the term of this patent is extended or adjusted under 35 U.S.C. 154(b) by 0 days.

(21) Appl. No.: 09/367,658
(22) PCT Filed: Mar. 13, 1998
(86) PCT No.: PCT/DK98/00093
§ 371 Date: Aug. 20, 1999
§ 102(e) Date: Aug. 20, 1999
(87) PCT Pub. No.: WO98/40946
PCT Pub. Date: Sep. 17, 1998

(30) Foreign Application Priority Data

Mar. 13, 1997 (DE) .......................................... 197 10 319

(51) Int. Cl.$^7$ ................................................ H02H 3/00
(52) U.S. Cl. .......................................... 361/93.9; 361/18
(58) Field of Search .............................. 361/18, 23, 31, 361/57, 93.1, 93.9; 323/282, 284, 289, 276, 277; 363/50, 52, 53, 55, 56, 74, 75, 76, 78

(56) References Cited

U.S. PATENT DOCUMENTS 5,898,554 A * 4/1999 Schnetzka et al. ............ 361/18

* cited by examiner

Primary Examiner—Ronald W. Leja
(74) Attorney, Agent, or Firm—Lee, Mann, Smith, McWilliams, Sweeney & Ohlson

(57) ABSTRACT

A conventional circuit for blocking a semiconductor switching device (7) on overcurrent, the semiconductor switching device (7) having at least one continuously driven semiconductor switch (9), comprises a diver circuit (11), which has a driver stage (12) for each semiconductor switch (9), a control pulse generator (10) for producing control pulses ($P_1$ to $P_6$), which are fed in operation to a control input of the semiconductor switching device (7) via the driver circuit (11), and a monitoring device (34), which measures the current (I) flowing through the semiconductor switching device (7) and, when an overcurrent occurs, generates a fault signal (E), which initiates blocking of the semiconductor switching device (7). When the semiconductor switching device is being blocked, a high overvoltage can occur therein, possibly leading to destruction of the semiconductor switching device. In order to reduce, with little outlay, the overvoltage in the semiconductor switching device during blocking thereof, provision is made such that the operating voltage (U) of the driver circuit (11) is arranged to be switched over briefly by the fault signal to a lower, interim value corresponding to a lower current (I) through the semiconductor switching device (7) and then, within the maximum permissible duration for loading the semiconductor switching device (7) with an overcurrent, to be switched off completely.

9 Claims, 3 Drawing Sheets

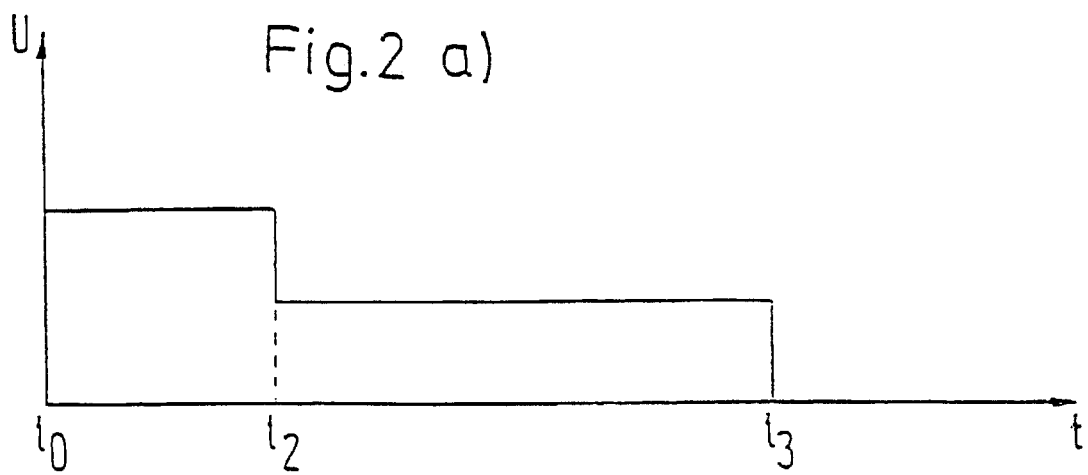
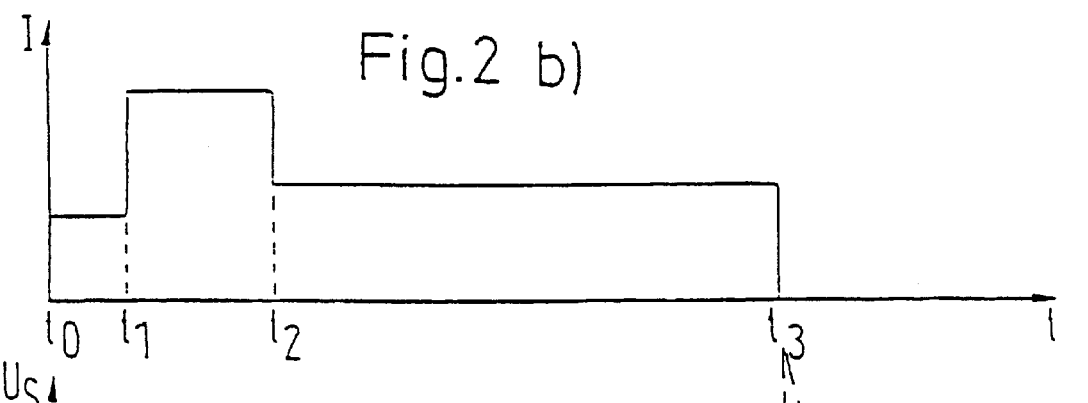
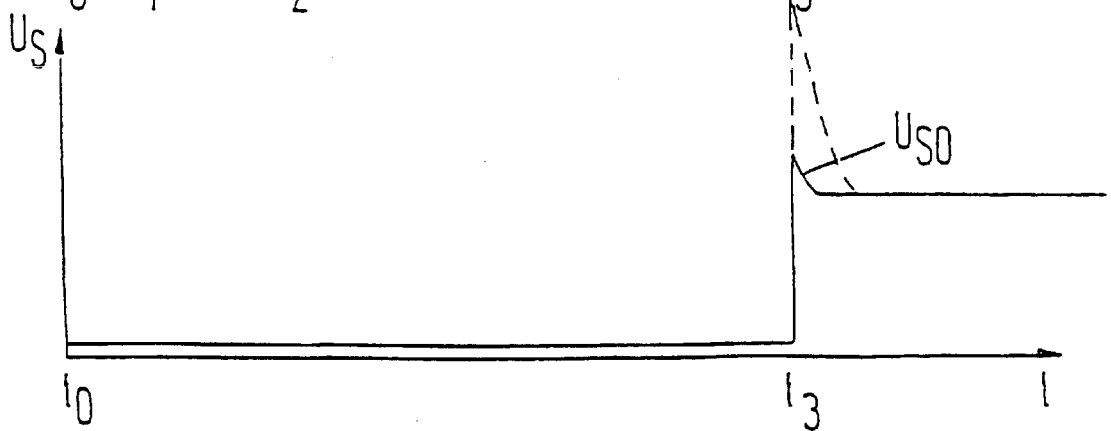

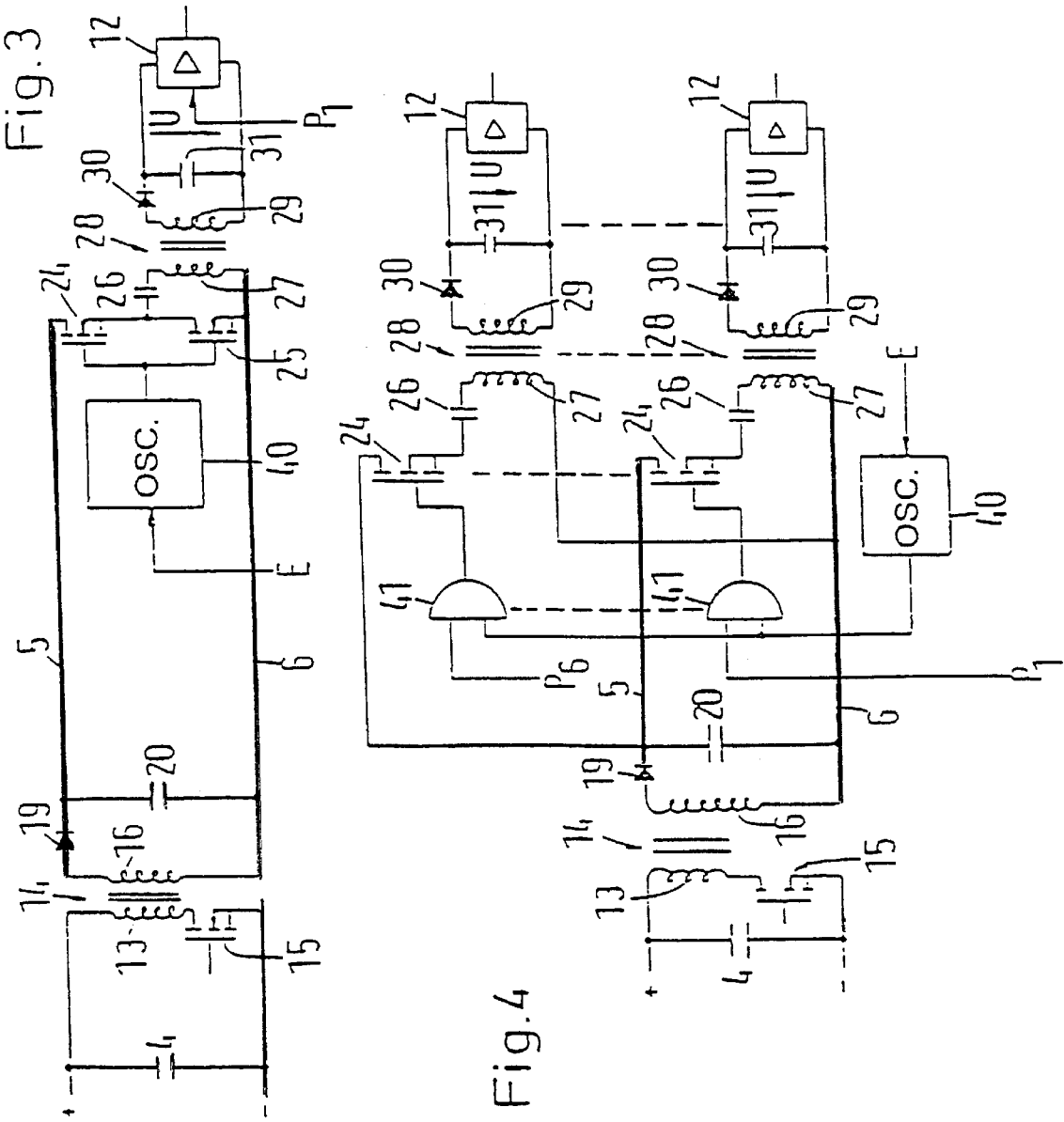

CIRCUIT FOR BLOCKING A SEMICONDUCTOR SWITCHING DEVICE ON OVERCURRENT

BACKGROUND OF THE INVENTION

The invention relates to a circuit for blocking a semiconductor switching device on overcurrent, the semiconductor switching device having at least one continuously driven semiconductor switch, which circuit comprises a driver circuit having a driver stage for each semiconductor switch, a control pulse generator for producing control pulses, which are fed in operation to a control input of the semiconductor switching device via the driver circuit, and a monitoring device, which measures the current flowing through the semiconductor switching device and which, when an overcurrent occurs, generates a fault signal, which initiates blocking of the semiconductor switching device.

The semiconductor switching device is generally an inverter having several power switching transistors in the form of semiconductor switches.

In a known circuit of that type (EP 0 521 260 B1), free-wheeling diodes are connected anti-parallel to each semiconductor switch in order to avoid, at the semiconductor switches, overvoltages that are caused by inductive resistors, such as choke coils, inductive loads or lead inductances, in the circuitry of the semiconductor switches when a semiconductor switch is switched off (blocked) in normal operation. When an overcurrent, for example a short-circuit current, flows through the semiconductor switches, it is, however, possible for even higher overvoltages to occur. The known circuit should reduce those overvoltages by blocking one of the series-connected semiconductor switches simultaneously carrying an overcurrent, without increasing the amount of circuitry involved by using capacitors. Notwithstanding, free-wheeling diodes are still required. Even when those are provided, when a semiconductor switch carrying a very high overcurrent, such as a short-circuit current, is being blocked, in the circuit of which semiconductor switch there is a high inductive reactance, a very high overvoltage can still occur at the blocked semiconductor switch.

SUMMARY OF THE INVENTION

The invention is based on the problem of providing a circuit of the kind mentioned at the beginning that allows, with little outlay, a further reduction in an overvoltage at the semiconductor switching device when that is being blocked because of an overcurrent.

According to the invention, that is achieved by means of the fact that the operating voltage of the driver circuit is arranged to be switched over briefly by the fault signal to a lower, interim value corresponding to a lower current through the semiconductor switching device and then, within the maximum permissible duration for loading the semiconductor switching device with an overcurrent, to be switched off completely.

In this solution, therefore, the overcurrent is reduced to zero in stages. For each switching-off stage, the amount by which the current flowing through the semiconductor switching device decreases is, therefore, also smaller. Consequently, the rate of change (di/dt) of the current is correspondingly lower for each switching-off stage, as is, therefore, the voltage induced in the inductive reactance in the circuit of the semiconductor switching device by the change in the current (Ldi/dt). Because the induced voltage is added to the operating voltage of the semiconductor switching device when the semiconductor switching device is being blocked, the total overvoltage at the semiconductor switching device when the blocking occurs is also lower. The semiconductor switching device is, therefore, not unduly loaded and does not require additional circuitry to reduce overvoltage when blocking occurs.

Provision is preferably made such that, for several semiconductor switches jointly supplied from one operating voltage source, the current flowing through the semiconductor switches is measured in a supply line common to all th e semiconductor switches by the monitoring device, a single measuring device in the monitoring device being sufficient for all the semiconductor switches.

Provision can then be made such that, for several semiconductor switches, the driver stages thereof are all supplied from a common operating voltage source, which is galvanically isolated from the driver stages and which, as a function of the fault signal, is arranged to be switched over to the interim value and switched off. In that arrangement, there is no need, when an overcurrent occurs in a semiconductor switch, to determine which semiconductor switch is affected. There is, accordingly, less outlay on resources in the monitoring device.

An advantageous practical form of the circuit can consist in that the operating voltage source of the driver circuit is a direct-current voltage source, which is connected, via a chopper controlled by a pulsed switching signal and a transformer having a secondary winding for each driver stage and via a rectifying circuit connected to the secondary winding, to a (respective) driver stage and the switching signal that controls the chopper is frequency- or pulse-length-modulated as a function of the fault signal. In that arrangement, the reduction in the operating voltage of the driver circuit when an overcurrent occurs is achieved by conversion of the operating voltage into a pulsed voltage and subsequent frequency- or pulse-length-modulation of the pulsed voltage.

The control pulses of the control pulse generator can be fed to a control input of the driver circuit in a customary manner.

Provision is preferably made such that the control pulses and the operating voltage for each driver stage are transmitted by means of a high-frequency carrier signal of an oscillator that is common to all the driver stages, via the same galvanic isolation stage. In that arrangement, galvanic isolation between the switching device, which is optionally operated with high voltage, and the low-voltage-operated switching circuits controlling the driver stage(s) thereof is possible with little outlay on isolation stages.

A simple practical form can consist in combining the control pulses of the control pulse generator (when using frequency- or pulse-length-modulation of a driver circuit direct-current operating voltage converted into a pulsed intermediate circuit voltage by means of the chopper) with the switching signal controlling the chopper by means of an AND gate, in order to transmit the control pulses and the operating voltage to the driver stages with galvanic isolation.

A further alternative arrangement of the operating voltage source of the driver circuit can consist in that it has an output for a high, normal value and an output for the low, interim value, one of which outputs can be selected for the supply of the operating voltage as a function of the fault signal.

In that arrangement, the outputs can be connected by an OR gate.

Provision can then be made such that one output is connected, via a diode, to one end of the switching path of a controllable switch, the other output is connected, via a diode, to the other end of the switching path and to the driver circuit, and the switch is arranged to be switched as a function of the fault signal.

BRIEF DESCRIPTION OF THE DRAWINGS

The invention and its developments are described below in greater detail with reference to drawings of preferred embodiments.

FIGS. 2 a)–c) shows graphs illustrating the basic principle of the invention;

FIG. 3 shows a modification of the circuit according to FIG. 1; and

FIG. 4 shows a further modification of the circuit according to FIG. 1.

DESCRIPTION OF THE PREFERRED EMBODIMENTS

Figure 1:
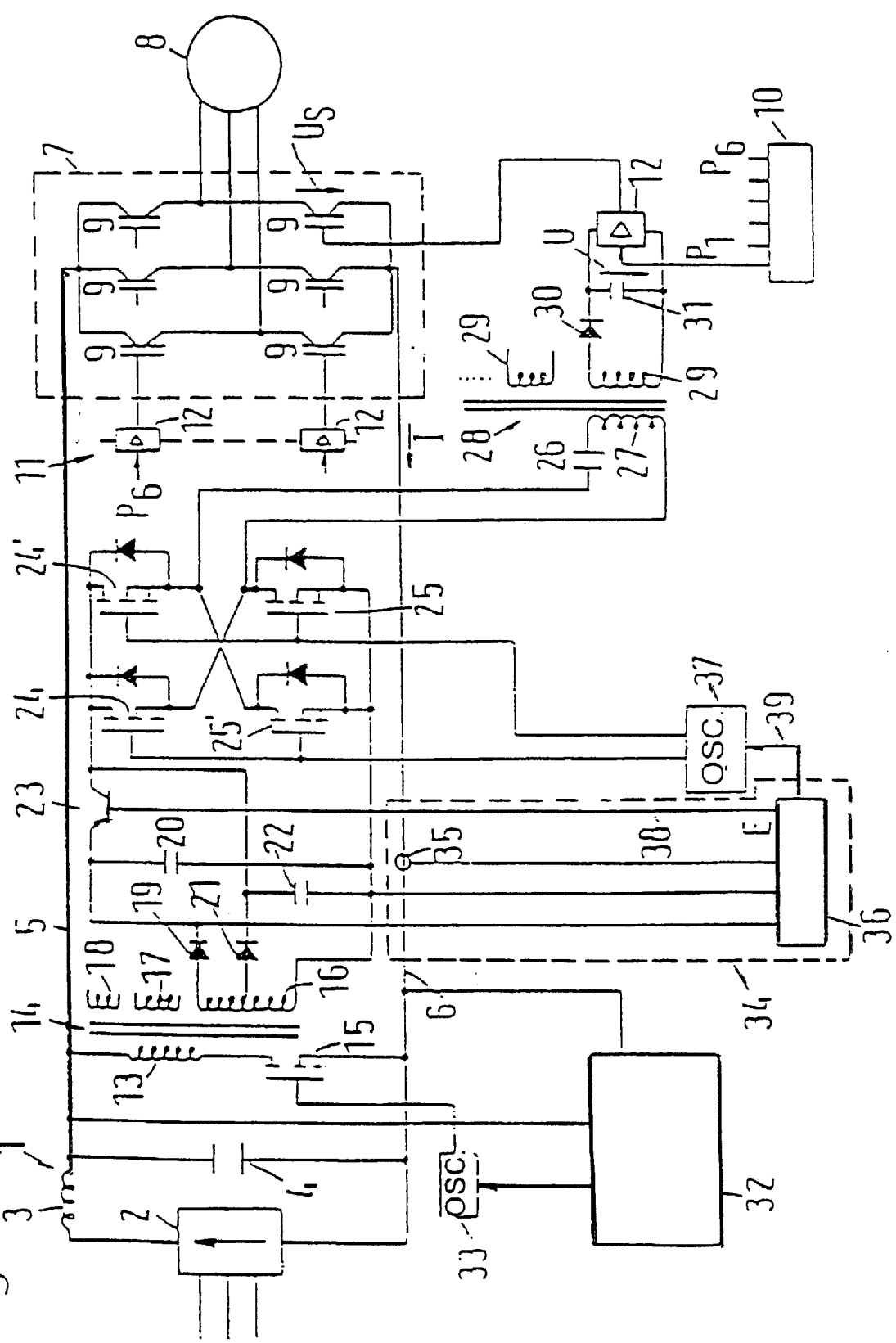
FIG. 1 shows a first embodiment of a circuit according to the invention, used with an inverter.

According to FIG. 1, an operating voltage source 1, here a direct-current voltage source, comprising a three-phase bridge rectifier 2, a smoothing inductor 3 and a smoothing capacitor 4, is connected, via supply lines 5 and 6, to a semiconductor switching device 7 in the form of an inverter for three-phase alternating current for the supply of an alternating-current load 8, here a three-phase alternating-current motor. The semiconductor switching device 7 comprises three series circuits each comprising two continuously driven semiconductor switches 9 connected parallel to the supply lines 5, 6, the interconnection points of the semiconductor switches 9 being connected to a respective phase of the alternating-current load 8. The semiconductor switches 9 are switching transistors, especially field-effect transistors, preferably IGBT's (INTEGRAL GATE BIPOLAR TRANSISTORS), that is to say bipolar transistors having an integral gate, for high power levels.

The control connections of the semiconductor switches 9 are fed by a control pulse generator 10 with control pulses $P_1$ to $P_6$, which are phase-shifted in accordance with the desired switching sequence and have the desired operating frequency of the alternating-current load 8, via a driver circuit 11, which has, for each semiconductor switch 9, a respective driver stage 12 connected on the output side to the control connection of one of the semiconductor switches 9. The control inputs of the driver stages 12 are each connected to a control pulse output of the control pulse generator 10, as illustrated for one driver stage 12.

The driver circuit 11 receives a direct-current operating voltage from a current supply device, which is constructed as follows: the primary winding 13 of a transformer 14 and a switching transistor 15 are connected to the operating voltage source 1 in series between the supply lines 5 and 6. The ends of a secondary winding 16 of the transformer 14, which is provided with further secondary windings 17 and 18, are connected to the series circuit comprising a diode 19 for the purpose of rectification and a smoothing capacitor 20. Between a centre tap of the secondary winding 16 and one end of the secondary winding 16 there is connected a further series circuit comprising a diode 21 for the purpose of rectification and a smoothing capacitor 22. The smoothing capacitor 20 is connected to the series circuit comprising a switching transistor 23 and a chopper in the form of an inverter formed by four bridge-connected switching transistors 24, 24', 25, 25' and free-wheeling diodes connected parallel to the switching transistors 24, 24', 25, 25'; the smoothing capacitor 22 is connected to the inverter only. In the null path of the bridge there is connected the series circuit comprising a capacitor 26 and a primary winding 27 of a transformer 28. The transformer 28 has a secondary winding 29 for each driver stage 12, only two of which secondary windings 29 are shown. Each secondary winding 29 is connected to the series circuit comprising a diode 30 for the purpose of rectification and a smoothing capacitor 31, only one of those series circuits being shown, in order to simplify the representation. Each capacitor 31 is connected to the current supply connections of a respective driver stage 12.

A voltage controller 32, which detects the output voltage of the voltage source 1 and compares it with a set value, causes, via an oscillator 33 having a controllable frequency determined as a function of the control error detected by the voltage controller 32, the switching transistor 15 (likewise a field-effect transistor) to be switched on and off periodically at the frequency of the oscillator 33. The switching frequency of the switching transistor 15 determines the inductive reactance of the primary winding 13 of the transformer 14 and, as a result, the voltage drop at the primary winding 13, on which voltage drop the output voltage at the secondary winding 16 in turn depends. The voltage controller 32 therefore ensures that the output voltage at the secondary winding 16 is largely constant irrespective of fluctuations in the output voltage of the operating voltage source 1. Consequently, the direct-current voltages occurring at the smoothing capacitors 20 and 22 are largely independent of fluctuations in the output voltage of the operating voltage source 1. The secondary windings 17 and 18 are used to supply current to components in the circuit, for example the voltage controller 32 and the oscillator 33.

A monitoring device 34 comprises a current sensor 35, which measures at a central location the current flowing through the semiconductor switching device 7 and all the semiconductor switches 9 in the supply line 6, and a control device 36, the operating voltage of which is taken from the smoothing capacitor 20, which control device 36 compares the current measured by the current sensor 35 with a reference value and, when there is an overcurrent, such as a short-circuit current, sends a fault signal E to the control connection of the switching transistor 23 via a line 38 and, after a delay, sends the fault signal to an oscillator 37 via a line 39. The oscillator 37 generates, at two outputs, inversely related pulses and sends those pulses, on the one hand, to the control connections of the switching transistors 24, 25' and, on the other hand, to the control connections of the switching transistors 24', 25.

The mode of operation of the arrangement illustrated in FIG. 1 is described below in greater detail, with reference also being made to FIG. 2. FIG. 2a shows the waveform of the operating voltage U in the driver stages 12; FIG. 2b shows the waveform of the current I flowing through the semiconductor switching device 7; and FIG. 2c shows the waveform of the voltage $U_s$ at a semiconductor switch 9.

As long as the monitoring device 34 does not detect an overcurrent, no fault signal E is fed to the switching transistor 23, with the result that it remains driven and the direct-current voltage at the smoothing capacitor 20 is present at the series circuits comprising the switching transistors 24, 25 and 24', 25', which are likewise field-effect transistors. Until an overcurrent is detected, the oscillator 37 is likewise continuously in operation and switches the series circuits comprising the switching transistors 24, 25 and 24', 25' in push-pull mode, that is to say alternately, via its output lines. The square-wave alternating-current voltage available at that time in the null path of the bridge comprising the switching transistors 24, 25, 24', 25', is divided up in accordance with the frequency of the oscillator 37 and the square-wave alternating-current voltage by means of the series circuit comprising the capacitor 26 and primary winding 27, which acts as a voltage divider, and induced, according to the transformation ratio of the transformer 28, in the secondary windings 29 thereof. The induced voltage is rectified by means of the diode 30 and smoothed by means of the capacitor 31 and applied to the relevant driver stage 12 in the form of operating voltage U. As a result, the driver stage 12 continues to operate and transmits the pulses, which are fed to it by the control pulse generator 10, to the control connection of the relevant semiconductor switch 9.

At time-point $t_1$ according to FIG. 2b, an overcurrent occurs, which is detected by the monitoring device 34 with a slight delay at time-point $t_2$ (because of its response delay). The control device 36 generates the fault signal E, which blocks the switching transistor 23. While the operating voltage U of the driver stages 12 maintained its high, nominal value from time-point $t_0$ until time-point $t_2$, at time-point $t_2$ the voltage at the inverter formed by the switching transistors 24, 25, 24', 25' switches over to the lower, direct-current voltage at the smoothing capacitor 22. As a result, at time-point $t_2$, the operating voltage U at the driver stages 12 also drops, as shown in FIG. 2a, as does, at the same time, the output current of the driver stages 12, so that the current I flowing through the semiconductor switching device 7 is reduced as a result of partial blockage at the semiconductor switches 9, as shown in FIG. 2b. Because the secondary winding 16 of the transformer 14 is tapped approximately in the centre, just half the voltage available at the smoothing capacitor 20 is available also at the smoothing capacitor 22. Consequently, the operating voltage U at the driver stages 12 drops to approximately half when the overcurrent is detected at time-point $t_2$. The current I is accordingly reduced to half at time-point $t_2$. After a delay, at time-point $t_3$, the control device 36 sends the fault signal to the oscillator 37 via the line 39 in the form of a blocking signal, with the result that operation of the oscillator 37 is interrupted and, therefore, the switching transistors 24, 25 and 24', 25' are no longer switched alternately on and off. There is, therefore, no longer any voltage at the primary winding 27, with the result that the transformer 28 transmits no voltage and, therefore, the operating voltage U is likewise switched off at time-point $t_3$ according to FIG. 2a. Consequently, the current I at time-point $t_3$ according to FIG. 2b is also interrupted. The time from the occurrence of the overcurrent at time-point $t_1$ to switching off of the semiconductor switching device 7 at time-point $t_3$ has been given a value such that it is shorter than the maximum permissible duration for loading the semiconductor switching device 7 with an overcurrent. When the current I is switched off at time-point $t_3$ there occurs only a slight overvoltage $U_{so}$ (FIG. 2c) at the semiconductor switch 9 carrying the overcurrent. In contrast, if the semiconductor switching device 7 were to be completely switched off at time-point $t_2$ when an overcurrent is detected, a very much higher overvoltage would occur at the relevant semiconductor switch 9, as shown by the broken line in FIG. 2c. That is explained by the fact that, when the semiconductor switch 9 carrying the overcurrent is being blocked in stages according to the invention, the rate of change di/dt of the current I at time-points $t_2$ and $t_3$ is only about half that that would arise from full blocking at time-point $t_2$ and, as a result, the voltage induced in an inductive reactance, for example the smoothing coil 3 and/or a coil in the alternating-current load 8 and/or the inductance of a lead, which induced voltage is added to the normal operating direct-current voltage of the semiconductor switch 9 in question when that semiconductor switch 9 is being blocked, is reduced according to the relation Ldi/dt because di drops, L being the inductance of the inductive reactance. There is therefore no need for additional circuitry in the semiconductor switches 9 to reduce such an overvoltage when one of the semiconductor switches 9 is being blocked.

FIG. 3 shows a portion of the arrangement according to FIG. 1 that has been modified with respect to the arrangement according to FIG. 1. Accordingly, compared with the arrangement according to FIG. 1, the centre tap of the secondary winding 16 of the transformer 14, the diode 21, the capacitor 22 and the switching transistors 23, 24', 25, 25' are omitted. Instead of those switching transistors, only the switching transistor 24 is still connected in series with the capacitor 26 and the primary winding 27. Furthermore, instead of the oscillator 37, a controllable oscillator 40 is provided, the single output of which is connected to the control input of the switching transistor 24 and which, when the fault signal occurs at time-point $t_2$ according to FIG. 2, is firstly switched over to a lower frequency, resulting in a lower operating voltage U, and then, at time-point $t_3$, is blocked or switched off. The switching transistor 24, therefore, also acts as a chopper as in the case of FIG. 1, the switching frequency of which is frequency-modulated by the pulsed output signal, which acts as a switching signal, of the oscillator 40 as a function of the fault signal E. The lower switching frequency of the chopper and of the output pulses thereof leads to an increase in the reactance of the capacitor 26 and to a decrease in the reactance of the primary winding 27 and in its voltage drop and, as a result, also in a decrease in the operating voltage U and the current I. It is, however, also possible so to construct the oscillator 40 that the pulsed switching signal it generates is pulse-length-modulated as a function of the fault signal E, namely, in such a manner that, at time-point $t_2$, the length of the pulses of the switching signal is diminished and finally, at time-point $t_3$, is reduced to zero.

Additionally, it should be mentioned that the frequency of the oscillators 37 and 40, including the lower value of the frequency of the oscillator 40, is very much higher than the pulse frequency of the pulse generator 10.

The arrangement according to FIG. 4 differs from that according to FIG. 3 essentially only in that the switching signals of the oscillator 40 are fed to one input of one AND gate 41 for each switching transistor 9, and to the other input of the AND gates 41 there are fed control pulses $P_1$ to $P_6$ from the relevant output of the control pulse generator 10. The outputs of the AND gates 41 are each connected to the control connection of one switching transistor 24 for each switching transistor 9. The high-frequency switching signal of the oscillator 40 acts, especially, as a carrier signal for the relevant, low-frequency control pulses $P_1$ to $P_6$. On the secondary side of each transformer 28, the carrier signal, having been amplitude-modulated by the relevant control pulses $P_1$ to $P_6$ in the relevant AND gate 41, is demodulated by the rectification and smoothing carried out by the diode 30 and the capacitor 31. In that process, the carrier signal is suppressed so that the waveform of the operating voltage U largely corresponds to that of the control pulses. The operating voltage U is, at the same time, supplied to the control connection (not shown in FIG. 4) of the relevant driver stage 12, which is still so constructed that it feeds the switching transistor 9 downstream with control pulses (firing pulses)

corresponding to the operating voltage pulses and control pulses fed to it. In that process, the operating voltage U of the relevant driver stage 12 is, as a function of the fault signal 3, reduced in stages with the aid of the oscillator 40 by means of frequency modulation or pulse-length modulation and finally switched off, and the relevant driver stage 12 is switched alternately on and off by means of the operating voltage pulses and the relevant control pulses $P_1$ to $P_6$ before complete switching-off. The components 12, 24, 26 to 31 and 41 are provided separately for each semiconductor switch 9 in order to transmit galvanically separated not only the oscillator pulses but also the control pulses $P_1$ to $P_6$ to the high-voltage-operated switching device 7 with the result that the other switching circuits which control the primary side of the galvanic isolation stages, here the transformers 28, can be operated using low voltage and yet no additional galvanic isolation stages are required for the transmission of the control pulses $P_1$ to $P_6$.

Modifications of the illustrated embodiments may, for example, consist in providing, for the purpose of galvanic isolation, not the transformer or the transformers 28 but rather other galvanic isolation stages, for example optocouplers. Furthermore, a two-way rectifier can be provided on the secondary side of the transformer or the transformers 28. It is also possible, in the embodiment according to FIG. 3, to omit the voltage controller 32, the diode 19, the capacitor 20, the switching transistor 24 acting as chopper, the capacitor 26 and the transformer 28 and to connect the diode 30 and the capacitor 31 directly to the secondary winding 16 of the transformer 14 and then to control the switching transistor 15 directly by means of the oscillator 40 as a function of the fault signal E, should no galvanic isolation between the high-voltage and low-voltage sides be necessary or desired. Instead of having only one switching transistor 24 for each chopper, the chopper(s) according to FIG. 3 and FIG. 4 can also be provided with push-pull-operating switching transistors, such as the switching transistors 24, 25, 24', 25' according to FIG. 1. A chopper having push-pull operation (having the switching transistors 24–25' according to FIG. 1) has the advantage that the primary winding 27 of the transformer or transformers 28 is operated with alternating current and, as a result, the ripple and, therefore, the extent of smoothing required on the secondary side of the transformer(s) is reduced. Finally, the invention can be used not only in a semiconductor switching device 7 having several semiconductor switches 9, such as an inverter, but also in a semiconductor switching device having only one semiconductor switch 9.

What is claimed is:

1. Circuit for blocking a semiconductor switching device on overcurrent, the semiconductor switching device having at least one continuously driven semiconductor switch, which circuit comprises a driver circuit having a driver stage for each semiconductor switch, a control pulse generator for producing control pulses, which are fed in operation to a control input of the semiconductor switching device via the driver circuit, and a monitoring device which measures current flowing through the semiconductor switching device and which, when an overcurrent occurs, generates a fault signal, which initiates blocking of the semiconductor switching device, the driver circuit having means to switch its operating voltage over briefly upon generation of the fault signal to a lower interim value corresponding to a lower current through the semiconductor switching device and then, within a maximum permissible duration for loading the semiconductor switching device with an overcurrent, to switch off the operating voltage completely.

2. Circuit according to claim 1, including, for several of said semiconductor switches jointly supplied from one operating voltage source, said monitoring device in a supply line common to all the semiconductor switches for measuring the current flowing through the semiconductor switches.

3. Circuit according to claim 1, in which driver stages for the semiconductor switches are all supplied from a common operating voltage source which is galvanically isolated from the driver stages and which, as a function of the fault signal, is arranged to be switched over to the interim value and then switched off.

4. Circuit according to claim 3, in which the operating voltage source of the driver circuit is a direct-current voltage source having a chopper controlled by a pulsed switching signal and a transformer having a secondary winding for each driver stage and a rectifying circuit connected to the secondary winding, each driver stage being connected to said at least one semiconductor switch, and the switching signal that controls the chopper being frequency- or pulse-length-modulated as a function of the fault signal.

5. Circuit according to claim 4, in which the control pulses of the control pulse generator are combined with the switching signal controlling the chopper by means of an AND gate.

6. Circuit according to claim 3, in which the control pulses and the operating voltage for each driver stage are transmitted by means of a high-frequency carrier signal of an oscillator that is common to all the driver stages, by a galvanic isolation stage.

7. Circuit according to claim 1, in which the control pulses of the control pulse generator are fed in operation to a control input of the driver circuit.

8. Circuit according to claim 1, in which the operating voltage source of the driver circuit has an output for a high, normal value and an output for the low, interim value, one of which outputs can be selected for the supply of the operating voltage as a function of the fault signal.

9. Circuit according to claim 8, in which one output is connected by a diode to one end of a switching path of a controllable switch, the other output is connected by a diode to another end of the switching path and to the driver circuit, and the switch is arranged to be switched as a function of the fault signal.

* * * * *